United States Patent

Schulte et al.

[11] Patent Number: 5,348,665
[45] Date of Patent: Sep. 20, 1994

[54] METHOD FOR THE DEGRADATION OF HARMFUL SUBSTANCES IN WATER BY MEANS OF HYDROGEN PEROXIDE UNDER UV IRRADIATION

[75] Inventors: Peter Schulte, Alzenau-Hoerstein; Michael Volkmer, Hanau; Frank Kuhn, Gelhausen, all of Fed. Rep. of Germany

[73] Assignee: Degussa Aktiengesellschaft, Frankfurt am Main, Fed. Rep. of Germany

[21] Appl. No.: 979,538

[22] Filed: Nov. 20, 1992

[30] Foreign Application Priority Data

Nov. 22, 1991 [DE] Fed. Rep. of Germany ....... 4138421

[51] Int. Cl.$^5$ ............................ C02F 1/30; C02F 1/72
[52] U.S. Cl. ..................................... 210/748; 210/759; 210/763; 588/212; 588/227; 588/247
[58] Field of Search ............... 210/192, 748, 758, 759, 210/763; 588/212, 219, 222, 227, 243, 247; 423/29, DIG. 20

[56] References Cited

U.S. PATENT DOCUMENTS

| | | | |
|---|---|---|---|
| 2,648,774 | 8/1953 | Whitlock | 250/43 |
| 3,924,139 | 12/1975 | Hirose et al. | 210/199 |
| 4,012,321 | 3/1977 | Koubek | 210/63 R |
| 4,204,956 | 5/1980 | Flatow | 210/192 |
| 4,446,029 | 5/1984 | Bertermier et al. | 210/748 |
| 4,792,407 | 12/1988 | Zeff et al. | 210/748 |
| 4,793,931 | 12/1988 | Stevens et al. | 210/636 |
| 4,849,114 | 7/1989 | Zeff et al. | 210/748 |
| 4,861,484 | 8/1989 | Lichtin et al. | 210/748 |
| 4,952,376 | 8/1990 | Peterson et al. | 422/186.3 |
| 5,043,080 | 8/1991 | Cater et al. | 210/748 |

FOREIGN PATENT DOCUMENTS

| | | |
|---|---|---|
| 0436922 | 7/1991 | European Pat. Off. |
| 2300273 | 7/1973 | Fed. Rep. of Germany |
| 3836850 | 5/1990 | Fed. Rep. of Germany |
| 1-258794 | 10/1989 | Japan |

OTHER PUBLICATIONS

German Gebrauchsmuster 90 17 684.7 to IBL Umwelt dated Jan. 2, 1992.
"Labortechnik und Arbeitsmethoden in der Photochemie".
Ullmanns Encyklopaedie der technishen Chemie, "Apparate fuer Lichtreaktionen," by Dr. Balke et al., (1951), p. 765.
G. O. Schenck, "Apparate fuer Lichtreaktionen und ihre Anwendung in der praeparativen Photochemie," pp. 105, 108 and 109.
N. Clarke et al., "High Purity Water Using $H_2O_2$ and UV Radiation," *Effluent and Water Treatment Journal*, Sep. 1982, pp. 335–341.
An advertizement by Peroxidation Systems, Inc. Perox--Pure Modular Treatment Services.
M. Malaiyandi et al., 2406 Water Research, vol. 14 (1980), No. 8, Oxford, Great Britain.
Patent Abstracts of Japan, Author Unknown, C-675, Jan. 16, 1990, vol. 14, No. 17, Abstract No. 1-258794.
"Chemische bzw. photochemische Oxidationsverfahren zur Entfernung organischer Bestandteile aus Abwaessern," D. Ott, 1989, pp. 134–158 "Wasserkalender".

*Primary Examiner*—Cynthia L. Nessler
*Attorney, Agent, or Firm*—Beveridge, DeGrandi, Weilacher & Young

[57] ABSTRACT

The degradation of harmful substances in water by compounds, such as hydrogen peroxide, which form hydroxyl radicals under UV irradiation in continuous reactors is improved when the irradiation is carried out in a reactor with a specific reactor volume of at least 10 liters per kW of the UV radiator or radiators, and if the amount of water to be treated is 0.25 to 25 times the amount of the intrinsic volume of the reactor flows through the reactor per hour. It is particularly preferred that the water volume per hour to be treated is 0.25 to 10 times the intrinsic reactor volume.

15 Claims, 3 Drawing Sheets

METHOD FOR THE DEGRADATION OF HARMFUL SUBSTANCES IN WATER BY MEANS OF HYDROGEN PEROXIDE UNDER UV IRRADIATION

BACKGROUND OF THE INVENTION

This invention relates to a method for the degradation of harmful substances, such as pollutants or contaminants, in water by means of compounds which form hydroxyl radicals, especially hydrogen peroxide, under UV irradiation. It is particularly preferred that the UV radiation is polychromatic radiation having a wavelength in the range of approximately 185 to 400 nm. Furthermore, the reaction may take place in a continuous flow reactor, through which the polluted or contaminated water flows, along with a sufficient amount of hydrogen peroxide.

U.S. Pat. No. 4,012,321; U.S. Pat. No. 4,446,029; German Patent Appl. No. 38 36 850 A; and D. Otto in "Wasserkalender," 1989 pp 134–158 show that the oxidation action of hydrogen peroxide can be vigorously increased if it is irradiated in an aqueous solution with monochromatic or polychromatic ultraviolet radiation. All of these references are entirely incorporated herein by reference. As a result of the UV irradiation, hydrogen peroxide decomposes into hydroxyl radicals and the harmful substances contained in the water are degraded by this strong oxidation agent. This treatment method is suitable for the degradation of families of compounds (classes of substances) which are chemically very different, such as hydrocarbons, alcohols, ethers, acids, aldehydes, ketones, amino compounds, halogen compounds, and cyanides. Typically, mercury low-pressure radiators are used as a radiation source for monochromatic radiation having wavelengths of, e.g., 185, 254 and 265 nm. Medium or high-pressure radiators are used for producing polychromatic radiation with a wavelength spectrum in the range of, e.g., 185 to 400 nm. To the extent it is desired, the oxidation action of the $H_2O_2$/UV irradiation system can be further increased by means of the addition of transitional metal ions, especially iron ions. This is described in U.S. Pat. No. 5,043,080, which patent is entirely incorporated by reference.

The treatment of water containing harmful substances with $H_2O_2$/UV radiation takes place on an industrial scale in continuous reactors. In the case of a low load of harmful substances, or in the case of readily degradable substances, a single passage of the water compounded with hydrogen peroxide through the irradiated reactor can be sufficient. A high load of harmful substances requires a process with reflux or recycle. It is known that the penetration depth of the radiation into the solution to be treated is only a few millimeters to a few centimeters. The penetration depth is a function of the wavelength of the radiation and the concentration of hydrogen peroxide and harmful substances in the water.

It is generally believed that, in order to achieve a satisfactory action, taking into consideration the indicated absorption behavior, the layers of liquid close to the radiator would have to be constantly renewed, and thus, the entire amount of liquid would have to be exposed to the short-wave radiation. To this end, the solution to be treated is pumped in a continuous manner at high speed through one or several continuous UV reactors connected in series. Typically, these UV reactors are tubular shaped. In the method of German Patent Appl. No. 38 36 850 A1, for example, reactors with a total layer thickness of irradiated solution of 1.65 to 12.5 cm are used, and the flow speed in the smallest section is adjusted to at least 0.2 m/sec. In the method of European Patent Appl. No. 0,436,922 A2 (which is also entirely incorporated herein by reference), tubular reactors are arranged around the radiation source. These tubular reactors have a radial layer thickness in the range of 0.1 to 50 mm.

In commercial tubular UV reactors, their specific volume is usually in the range of 1 to 10 liters per kilowatt (kW) of the electric power wattage of the radiator(s). The liquid flowthrough per hour should always be as high as possible, according to the data of the manufacturer, in order to achieve an ideal intermixing. Generally, the flowthrough rate is approximately 20 to 50 times the volume of the UV reactor.

A disadvantage of the previously known methods and commercial reactors is the requirement of having to use technically expensive and complicated UV reactors. In addition, the systems must be designed in such a manner that they can be operated with a high flowthrough rate, which further increases the necessary volume of capital. There was also interest in improving the rate of degradation of the harmful substances in water at a given performance (i.e., power, wattage) of the UV radiator (s) and with as low an outlay for equipment as possible.

BRIEF DESCRIPTION OF THE INVENTION

It is one objective of the invention to overcome these and other deficiencies in the known treatment processes.

In the method in accordance with the invention, the degradation of harmful substances in water includes adding to the water a sufficient amount of a compound which forms hydroxyl radicals under UV irradiation so as to perform a desired degree of degradation. Preferably, this compound is hydrogen peroxide. The water and compound are passed through a reaction zone, such as a continuous flow reactor and irradiated therein with UV radiation from at least one UV radiator. In the method in accordance with the invention, the reactor has a specific volume of at least 10 liters per kW of electric power of the UV radiator or radiators. Furthermore, in the method, an amount of water is treated per hour which is equivalent to 0.25 to 25 times an intrinsic volume of the reactor.

According to the preferred embodiments of the method of the invention, the specific reactor volume is 20 to 200 l/kW. 40 to 100 l/kW is particularly preferred. The amount of water to be treated per hour is preferably 0.25 to 10 times the amount of the intrinsic volume of the reactor. It is even more preferable if the hourly water flow is 0.5 to 5 times the intrinsic reactor volume, and 0.75 to 2 times the intrinsic reactor volume is particularly preferred. In order to increase the capacity and/or the rate of degradation of harmful substances, several UV reactors can be connected in series in a known manner.

In another aspect of the invention, a transitional metal catalyst may be added to the water to be treated. This catalyst supports oxidation of the harmful substances with the compound. Preferably, the catalyst is an iron compound.

In one preferred embodiment of the invention, the UV radiator is a polychromatic radiation source having a wavelength in the range of approximately 185 to 400 nm.

Additionally, the method in accordance with the invention may be carried out such that the irradiation takes place in a reactor, wherein the ratio of the non-irradiated volume to the irradiated volume, as determined by the penetration depth of radiation at a wavelength of 265 nm, is greater than 1.

BRIEF DESCRIPTION OF THE DRAWINGS

The invention will be described in conjunction with the attached Figures, wherein.

DETAILED DESCRIPTION OF THE INVENTION

Figure 1:
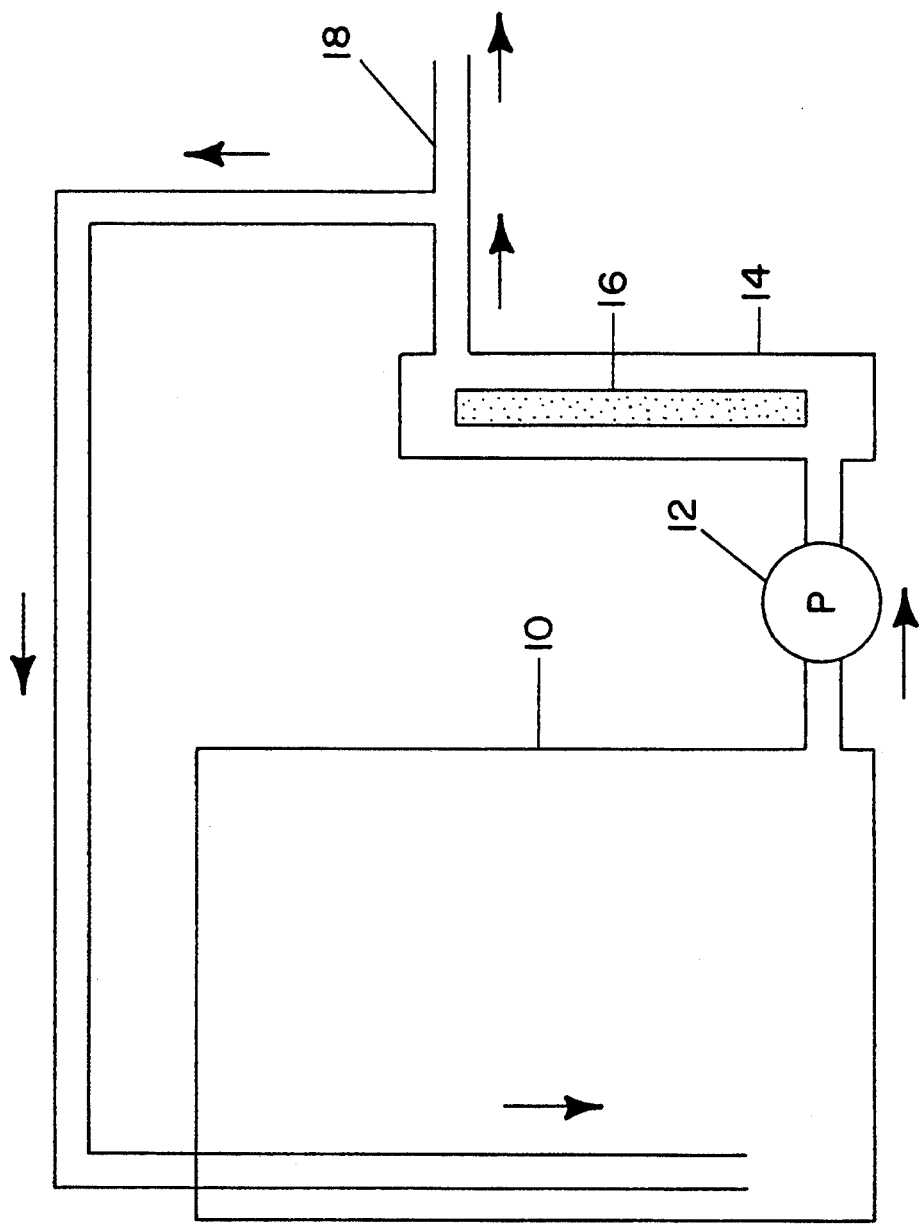
FIG. 1 which shows a schematic diagram of a reactor system such as that used in Example 1.

The method in accordance with the invention will be described in the detailed description which follows. Specific examples also follow which are intended to illustrate the method of the invention. These examples should be construed as being illustrative of the invention, and not limiting the same.

In principle, the method in accordance with the invention can be carried out with UV rays from a monochromatic or polychromatic radiation source; however, radiators with polychromatic radiation having an ultraviolet spectrum in the range of 185 to 400 nm are preferred. The entire spectrum of UV high-pressure radiators generally also sweeps over so as to include a portion of the visible light spectrum. In the case of polychromatic radiation from medium and high pressure radiators, it is surprising that no additional apparatus is required to elevate the turbulence in order to achieve a thorough intermixing of the reactor contents. A sufficient intermixing is achieved by the development of the heat from such radiators. The heating itself supports the degradation of harmful substances.

It is advantageous if the reactors used in accordance with the invention are cylindrical with the irradiated reactor volume to be associated with each radiator being considerably smaller than the total volume to be associated with the radiator (i.e., the reactor volume per radiator). The reactor, which can comprise one or several radiators in different arrangements, is therefore distinguished in that irradiated and non-irradiated volume components are present in it adjacent to each other. The ratio of the non-irradiated to the irradiated volume, determined by the penetration depth at a wavelength of 265 nm, is greater than 1 and preferably greater than 2. It is particularly preferred if this ratio is greater than 5. In the case of an axial arrangement of a radiator in a cylindrical container, the radius of the reactor is considerably greater than the penetration depth of the radiation. In this way, no expensive reactor design is necessary; but rather, the radiators can be built into customary containers. In addition, devices for circulating the reactor contents, as well as apparatuses for recirculation between a UV reactor and a receiver container or a post reaction container are rendered superfluous. The output of the pumps is merely adapted to the desired capacity.

Although not wishing to be bound by any particular theory of operation, it is believed that the increase of the degradation rate comes about because several reactions take place in parallel in the reactor in the method of the invention. These reactions include: (a) the photo-reaction under formation of the reactive hydroxyl radicals; (b) the conversion reaction of the hydroxyl radicals with the harmful substances; (c) the conversion of molecules of the harmful substances activated by UV absorption with hydrogen peroxide; and (d) the oxidation of side products obtained from the conversion according to reactions (b) and (c) with $H_2O_2$ or OH radicals. The available radiator performance is better utilized.

The method of the invention is suitable for the degradation of chemically different compounds containing carbon, such as those already mentioned in the Background section of this application. Formaldehyde can be degraded particularly well, wherein, as is apparent from the reference examples which follow, degradation was not satisfactory and/or a rather significant expense was involved in the state of the art processes.

The pH in the solution to be treated is adapted to the harmful substances contained in the solution by the addition of acids or bases. The pH is frequently in the acidic pH range; however, a pH in the range of 8–11 is customary, for example, in the degradation of complex cyanides.

The water to be treated which is flowing through the UV reactor contains hydrogen peroxide in an effective amount so as to degradate the harmful substances. The dosing of hydrogen peroxide takes place in a known manner by means of aqueous solutions with a content between 0.3 and 85% $H_2O_2$ by weight, especially 30 to 75% $H_2O_2$ by weight, with the amount depending on the harmful substance content and the desired degradation of the harmful substances. Those skilled in the art will easily determine the optimum amount of $H_2O_2$ by an orienting test. Instead of $H_2O_2$, compounds can also be used which split off $H_2O_2$ in aqueous solution. Examples of such compounds are sodium percarbonate or sodium perborate. Compounds can also be used which form OH radicals themselves under UV irradiation, such as, peroxycarboxylic acids.

The temperature during the $H_2O_2$/UV treatment may range from approximately 5° C. to approximately 95° C., with the range of 20° to 90° C. being especially preferred. In the case of substances which are difficult to degrade, a treatment at elevated temperatures, such as, 50° to 80° C. is usually advantageous. If medium and high-pressure radiators are used, too much warming can occur, for example, in the case of a high energy charge with a low flowthrough rate, such that cooling measures are required in order to maintain the temperature below 95° C. It is preferred that the temperature be kept below 90° C. In the case of low-pressure radiators, it is necessary, as a rule, to maintain the temperature constant in the range of 5° to 30° C.

The method of the invention also includes the co-use of catalytically active transition metal ions as a catalyst, particularly iron (Fe) ions. This catalyst supports the oxidation of the harmful substances. The $H_2O_2$/UV/Fe ion system exhibits, as is known, a synergistic effect as compared to the $H_2O_2/UV$ and the $H_2O_2/Fe$ ion systems. However, as a rule, the $H_2O_2/UV/Fe$ ion system makes it necessary to include a separating device for separating the resulting iron hydroxide sludges, as well as measures for the return of Fe ions or the removal of the sludges.

Those skilled in the art would not have expected that an improved method for the degradation of harmful substances with reduced equipment outlay was able to be achieved in the method in accordance with the invention. Particularly, it is unexpected that by the enlargement of the specific reactor volume and enlargement of the ratio of the non-irradiated to the irradiated volume and lowering of the flowthrough, improved results in accordance with the invention could be achieved.

The invention will be described in more detail by the following examples and reference examples.

EXAMPLES 1 TO 4

These Examples relate to the degradation of formaldehyde in a water, additionally containing formic acid, with hydrogen peroxide under UV irradiation. In these Examples, the UV radiation source was a high-pressure lamp, type: DQ 1023 of the firm W. C. Heraeus GmbH, Hanau, Germany. The degradation of harmful substances takes place in variously dimensioned, cylindrical UV reactors, while varying the flowthrough rate. The conditions were as follows: (a) Formaldehyde concentration: 1.3 g/l; (b) $H_2O_2$ addition: up to a concentration of 3.0 g/l; (c) electric power of the radiator: 1 kW; (d) pH: adjustment with formic acid to 3.0; and (e) reaction temperature: approximately 25° C. The tests took place in a batch method with a 600 liter specimen in each instance. The particular UV reactor was tied into a loop including a 600 liter storage container with the solution to be treated, and, in addition to the UV reactor, a circulation pump and the loop line in Examples 1 to 3. The treatment time was 60 minutes.

The physical characteristics of Reactor A are as follows:

Height: 80 cm; diameter: 10 cm; volume (less the volume of the UV lamp): 4 liters; arrangement of the lamp: axial.

FIG. 1 shows a schematic drawing of a reactor system such as that of Reactor A. The water to be treated is stored in a 600 liter storage tank 10. A circulation pump 12 pumps the water to be treated into the reactor 14. The ultraviolet light source 16 is arranged axially to the direction of flow with respect to the cylindrical axis of the reactor 14. The UV radiator 16 is shown in reactor 14 in FIG. 1. After the water is irradiated and flows through the reactor 14, it is recirculated into the storage tank 10 and after treatment, discharged via the discharge pipe 18.

In the reactor systems in accordance with the invention, the UV light source may be integrated into the wall of the reactor in a conventional container, or the reactor may be made of an ultraviolet transmissive material, wherein the UV source is independent from the reactor.

The physical characteristics of Reactor B are as follows:

Height: 200 cm; diameter: 30 cm; filling volume: 120 liters; arrangement of the lamp: obliquely to the flow; inflow: at the lower end of the reactor; discharge: at the upper end of the reactor.

Figure 2:
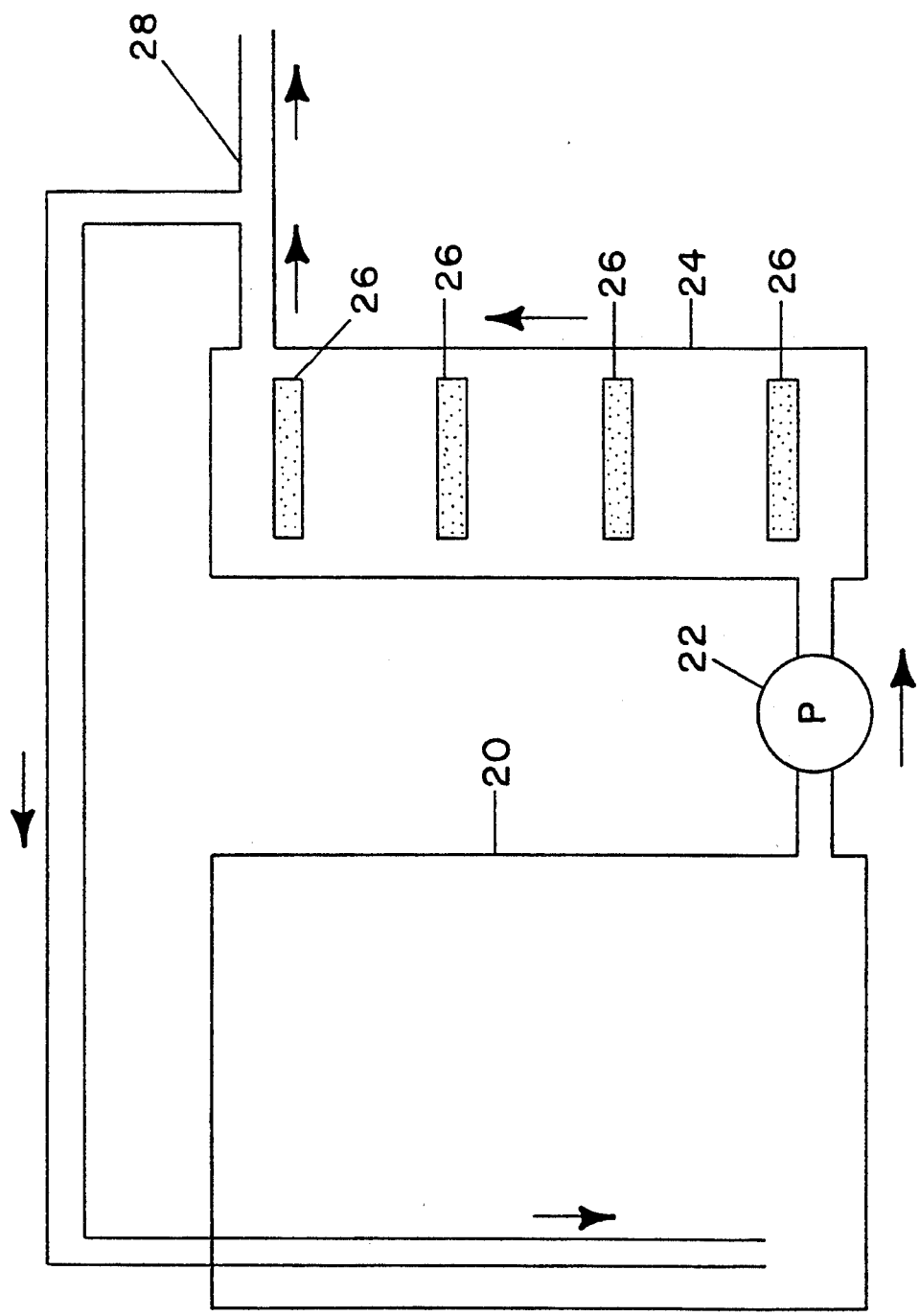
FIG. 2 which shows a schematic diagram of a reactor system in accordance with the invention.

FIG. 2 shows a schematic diagram of a reactor system such as the one used for Reactor B. In this schematic, the water to be treated is stored in a 600 liter storage tank 20. The water to be treated is pumped from the tank 20 to the reactor 24 via a circulation pump 22. The water enters the reactor 24 at the bottom and is irradiated by UV radiation sources 26 arranged obliquely to the direction of flow. One or more UV radiation sources 26 may be used, for example, four are shown in FIG. 2. The treated water exits the top of the reactor 24 through discharge pipe 28.

FIG. 2 also shows an recirculation loop 30, wherein the water may be recirculated to the tank 20 for further treatment. The finally treated water is discharged for further processing or disposal through pipe 32.

The physical characteristics of Reactor C are as follows:

Height: 150 cm; diameter: 120 cm; volume: 1700 liters; arrangement of the lamp: axial; inflow and discharge: through opposite connection pieces at the cylindrical wall; filling height during operation: 53 cm (=600 liters). The loop of the test arrangement in Example 4 did not contain a storage container.

Figure 3:
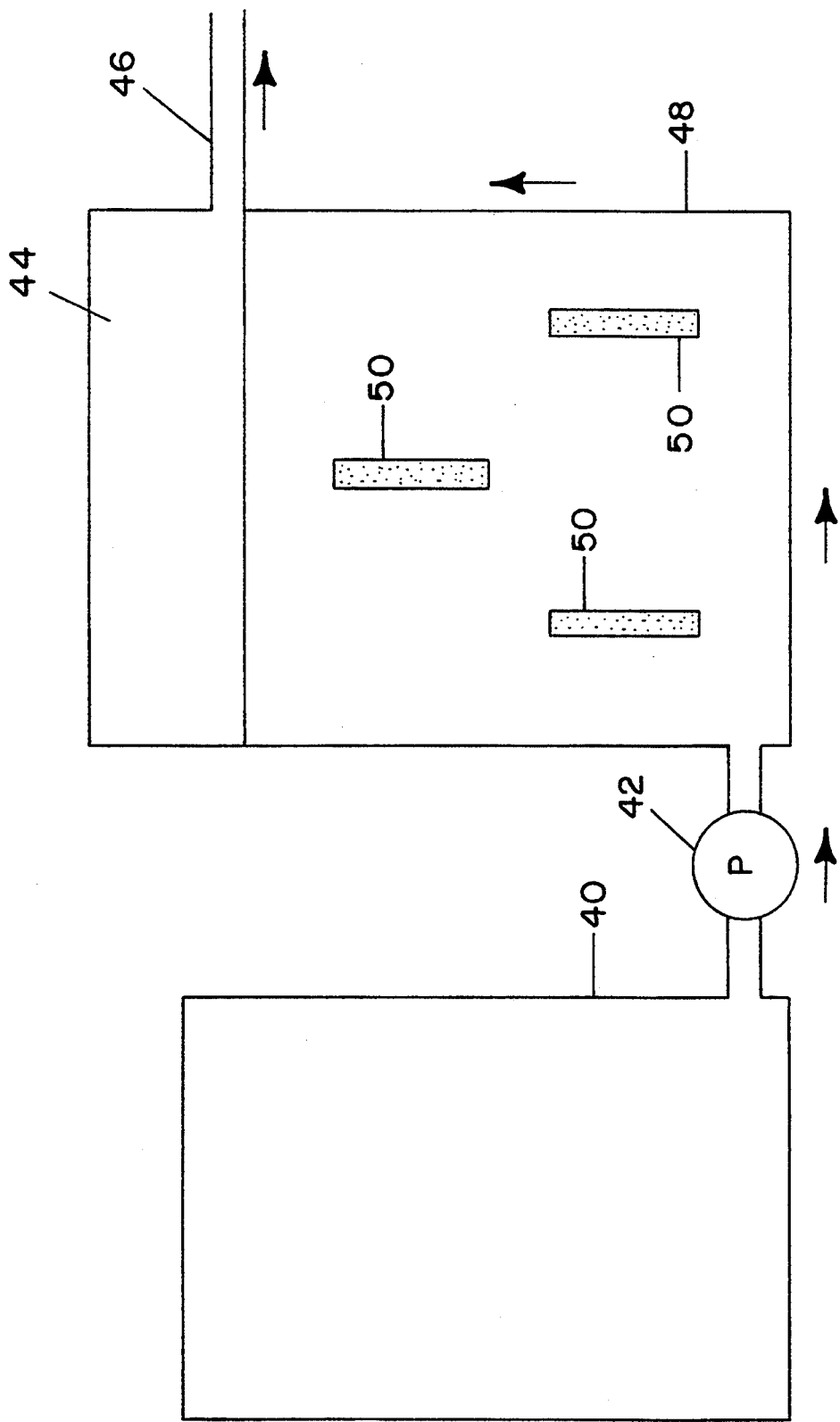
FIG. 3 which shows a schematic diagram of another reactor system in accordance with the invention. The figures are schematic representations of reactor systems such as those used in the process in accordance with the invention. The figures are not intended to be drawn to scale. They should be considered as illustrative of the invention, and not limiting the same.

FIG. 3 shows a schematic diagram of a reactor system such as that used in Reactor C. A storage container 40 is shown, although, as noted above, the arrangement of Example 4 did not include the storage container 40. Those skilled in the art will recognize that the water for treatment may be introduced into the reactor system directly from a previous process, without the need for a storage container. A circulation pump 42 introduces the water to be treated into the bottom of the reactor 44. The treated water exits the reactor 44 through a discharge pipe 46 at the opposite side and at the bottom of the reactor 44. As also mentioned above, the reactor 44 is only partially filled with water 48 during operation of the system. Ultraviolet radiation source(s) 50 are arranged in the axial direction with respect the cylindrical axis of the reactor 44. As an example, in the system of FIG. 3, three ultraviolet radiation sources 50 are shown, although more or less may be used.

The results of the treatment process and the test data using Reactors A, B and C are shown below in Table 1.

TABLE 1

| Example No. | Reactor | Spec. Reactor Volume liters per kW | Flow-through liter/h (RV/h)* | $H_2O_2$** Degradation mg per liter | $CH_2O$*** Degradation mg per liter |
| --- | --- | --- | --- | --- | --- |
| 1 | A | 4 | 600 (150) | 325 | 95 |
| 2 | B | 120 | 8500 (70.8) | 170 | 105 |
| 3 | B | | 600 (5.0) | 385 | 125 |
| 4 | C | 600 | 600 | 500 | 260 |

TABLE 1-continued

| Example No. | Reactor | Spec. Reactor Volume liters per kW | Flow-through liter/h (RV/h)* | $H_2O_2$** Degradation mg per liter | $CH_2O$*** Degradation mg per liter |
|---|---|---|---|---|---|
| | | | (1) | | |

*RV = Reactor Volumes
**Determination by the Cerium (IV) Sulfate Method } Determination of content after end of test using a specimen from the 600 liter
***Determination by the Sulfite Method  storage container or the 600 l reactor
Note: The work was performed in analogy to Example 1, at 70° C. and 2 kW radiator power at a flow through of 2.5 or 0.4 m³/h. The formaldehyde degradation was 10 and 20%.

The cerium (IV) sulfate method for determining hydrogen peroxide degradation and the sulfite method for determining $CH_2O$ (formaldehyde) degradation are well known to those skilled in the art.

Example 1 is not in accordance with the invention with regard to the specific reactor volume and also the flowthrough rate. Example 2 is not in accordance with the invention with regard to the flowthrough rate. In Example 3, which is in accordance with the invention, the degradation of formaldehyde was increased over that in Example 2 by approximately 19% and by 32% over Example 1. The significant influence of the enlarged specific volume follows from a comparison of Examples 3 and 4.

EXAMPLES 5 AND 6

The waste water treatment in these Examples takes place in the loop system according to Examples 2 and 3, that is, with reactor B, but with 3 UV radiators of 1 kW electric power each. The radiator arrangement is oblique to the flow. Treatment time is 2 hours. The formaldehyde content of the 600 liter batch at the start was 1.3 g/l, the $H_2O_2$ content at the start was 3.0 g/l, and the pH was 3. The results are shown in Table 2. The $H_2O_2$ content and the $CH_2O$ content are determined from a specimen from the storage container, removed after the end of the test.

TABLE 2

| Example No. | Flowthrough l l/h | $H_2O_2$ degradation mg/l | $CH_2O$ degradation mg/l |
|---|---|---|---|
| 5 | 8500 (70.8) | 1050 | 460 |
| 6 | 300 (2.0) | 1710 | 680 |

Example 5 is not in accordance with the invention. The degradation of formaldehyde was increased over Example 5 by approximately 50% by reducing the flowthrough in Example 6.

EXAMPLES 7 TO 9

The degradation of formaldehyde in a continuous process with a capacity of 400 liter/h was investigated. The following equipment systems formed the base for these examples:

Example 7

Small UV reactor (length: 77 cm; diameter: 8 cm; effective volume: 3.5 liters); UV high-pressure radiator, 2 kW electric power. Direct passage with 400 liters/h from a storage container with 600 liters of the water compounded with $H_2O_2$ to be treated. Determination of $CH_2O$ after the water has left the UV reactor.

Example 8

UV reactor according to Example 7, tied into a loop including the reactor, a non-irradiated storage container, a loop line and a pump. 400 liters/h of water to be treated was supplied in a continuous manner to the storage container with 600 liters of water to be treated and the equivalent amount of treated water was removed. Flowthrough in the loop was 10 m³/h.

Example 9

The storage container of Example 8 with the same degree of filling (600 liters) and the same 2 kW radiator served as the UV reactor; inflow and outflow from the 600 liter UV reactor were 400 l/h each. The water to be treated in the examples was process water from a polyol production. This water contained formaldehyde, formic acid, formate, methanol and had a pH of 2.5 to 2.8 and a temperature of 60° to 70° C. Prior to entrance into the reactor (examples 7, 9) and into the storage container (example 8), 2.0 g $H_2O_2$ (as 50% by weight aqueous solution) per liter water were added. The degradation rate (% formaldehyde) was determined in the treated water removed.

TABLE 3

| Example No. | Inflow | | Outflow | | $CH_2O$ degradation rate % | Temperature °C. |
|---|---|---|---|---|---|---|
| | $CH_2O$ | $H_2O_2$ | $CH_2O$ | $H_2O_2$ | | |
| 7 | 1.30 | 2.0 | 1.05 | 1.55 | 20 | 66→69 |
| 8 | 0.95 | 2.0 | 0.65 | 1.60 | 32 | 71→72 |
| 9 | 1.0 | 2.0 | 0.40 | 0.70 | 60 | 60→58 |

The degradation rate was able to be increased by over 50% by means of the combination of the non-inventive reactor (Example 7) with an irradiated reactor and loop arrangement (Example 8, also not in accordance with the invention); however a degradation rate three times greater is achieved in Example 9, which is in accordance with the invention.

EXAMPLE 10

Process waste water with the following composition was treated in a continuous manner with $H_2O_2$ under UV irradiation in accordance with the invention in a reactor with a diameter of 60 cm and a volume of 600 liters. The flowthrough, the amount of $H_2O_2$ and the energy charge (1–5 high-pressure radiators, 2 kW each, type DQ 2023 of the firm W. C. Heraeus GmbH, Hanau) were varied. Composition of the water: approximately 1.6 g/l formaldehyde, approximately 1.8 g/l formic acid, 0.5 g/l methanol, 0.01 g/l calcium formate; CSB value approximately 3.5 g/l. The results follow from Tables 4 to 6.

TABLE 4

Formaldehyde degradation as a function of the flowthrough and the irradiation of energy at an initial concentration of $H_2O_2$ of 2 g $H_2O_2$/l process waste water

| Flowthrough | Formaldehyde degradation (%) | | | |
|---|---|---|---|---|
| ($m^3$/kh) | 0 kW | 2 kW | 6 kW | 10 kW |
| 0.4 | 10 | 60 | 74 | 74 |
| 0.6 | 10 | 52 | 58 | 69 |
| 0.8 | 10 | 35 | 50 | 62 |

TABLE 5

Rate of formaldehyde degradation (%) at 0.4 $m^3$/h flowthrough, 3 × 2 kW HD radiator as a function of the concentration of $H_2O_2$.

| $H_2O_2$ concentration (g/l) | $CH_2O$ degradation (%) |
|---|---|
| 1.0 | 50 |
| 2.0 | 73 |
| 3.0 | 81 |

TABLE 6

Connecting 2 reactors in series: (volume of each: 600 liters; diameter: 60 cm and 100 cm). Formaldehyde degradation rate as a function of the flowthrough; $H_2O_2$ concentration: 2 g/l; a 5 × 2 kW radiator in each of the reactors (Reactor 1 and Reactor 2).

| Flowthrough | $CH_2O$ degradation (%) | | Temperature |
|---|---|---|---|
| ($m^3$/h) | after Reactor 1 | after Reactor 2 | (°C.) |
| 0.8 | 61 | 75 | 70→93 |
| 1.2 | 57 | 71 | 72→88 |
| 1.6 | 43 | 58 | 69→82 |

EXAMPLE 11

Example 10 was repeated using a reactor with a diameter of 100 cm. Essentially the same results as in Example 10, Tables 4 and 5, resulted.

While the invention has been described in terms of various specific examples, those skilled in this art will recognize that various modifications and changes can be made without departing from the spirit and scope of the invention, as defined in the claims.

The priority document, German Patent Application No. P 41 38 421.0, filed in Germany on Nov. 22, 1991, is relied on and entirely incorporated herein by reference.

We claim:

1. A method for degradation of a harmful substance in water, comprising:
adding to the water a sufficient amount of a compound which provides a source of hydroxyl radicals under UV irradiation for performing a desired degree of degradation; passing the water and compound through a continuous flow reactor; irradiating the water and compound in the reactor with UV radiation from at least one UV radiator, such that a ratio of the non-irradiated volume to the irradiated volume, as determined at a wavelength of 265 nm, is greater than 2, wherein the reactor has a specific reactor volume of at least 40 liters per kW of electric power of the at least one UV radiator and wherein an amount of water is treated per hour which is equivalent to 0.5 to 5 times an intrinsic volume of the reactor.

2. The method according to claim 1, wherein the specific reactor volume is 40 to 100 l/kW.

3. The method according to claim 1, wherein the amount of water treated per hour is 0.75 to 2 times the intrinsic volume of the reactor.

4. The method according to claim 1, wherein during the passing step, the water to be treated flows through several reactors connected in series.

5. The method according to claim 1, wherein the water to be treated contains formaldehyde as the harmful substance.

6. The method according to claim 1, wherein the UV radiator is a polychromatic radiation source having a wavelength in the range of approximately 185 to 400 nm.

7. The method according to claim 1, wherein the compound is selected from the group consisting of: hydrogen peroxide, sodium percarbonate, sodium perborate and peroxycarboxylic acids.

8. The method according to claim 1, further comprising:
adding a transitional metal catalyst to the water to be treated to support oxidation of the harmful substance with the compound.

9. The method according to claim 8, wherein the catalyst is an iron compound.

10. The method according to claim 8, wherein the compound is hydrogen peroxide.

11. A method for degradation of a harmful substance in water, comprising:
adding a sufficient quantity of hydrogen peroxide to the water, wherein the hydrogen peroxide provides a source of hydroxyl radicals, so as to achieve a desired degree of degradation of the harmful substance contained in the water;
passing the water and hydrogen peroxide through a reaction zone;
irradiating the water and hydrogen peroxide in the reaction zone with ultraviolet radiation from at least one ultraviolet radiator, such that the hydrogen peroxide forms hydroxyl radicals which oxidize the harmful substance in the water, and wherein a ratio of the non-irradiated volume to the irradiated volume, as determined at a wavelength of 265 nm, is greater than 2;
wherein the reaction zone has a specific volume of at least 40 liters per kilowatt of electric power of the at least one ultraviolet radiator, and wherein an amount of water treated per hour is equivalent to 0.5 to 5 times an intrinsic volume of the reaction zone.

12. The method according to claim 11, wherein the specific volume of the reaction zone is in the range of 40 to 100 l/kW.

13. The method according to claim 11, wherein the amount of water treated per hour is 0.75 to 2 times the intrinsic volume of the reaction zone.

14. The method according to claim 11, wherein during the passing step, the water to be treated flows through several reactors connected in series.

15. The method according to claim 11, further comprising:
adding an iron containing compound to the water as a catalyst to support oxidation of the harmful substance.

* * * * *